US006535979B1

United States Patent
Vialen et al.

(10) Patent No.: US 6,535,979 B1
(45) Date of Patent: Mar. 18, 2003

(54) METHOD OF CIPHERING DATA TRANSMISSION, AND CELLULAR RADIO SYSTEM

(75) Inventors: Jukka Vialen, Espoo (FI); Juhana Britschgi, Helsinki (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/238,313

(22) Filed: Jan. 28, 1999

(30) Foreign Application Priority Data

Jan. 29, 1998 (FI) .................................................. 980209

(51) Int. Cl.⁷ ................................................. G06F 1/24
(52) U.S. Cl. ..................... 713/163; 713/200; 713/201; 380/247
(58) Field of Search ................................ 380/247, 249; 713/163, 200, 201

(56) References Cited

U.S. PATENT DOCUMENTS

| | | | |
|---|---|---|---|
| 5,249,230 A | | 9/1993 | Mihm, Jr. ..................... 380/23 |
| 5,500,898 A | | 3/1996 | Nankaku ..................... 380/43 |
| 5,594,797 A | * | 1/1997 | Alanara et al. ................ 380/28 |
| 5,742,678 A | * | 4/1998 | Dent et al. ..................... 380/6 |
| 5,771,288 A | * | 6/1998 | Dent et al. ..................... 380/6 |

FOREIGN PATENT DOCUMENTS

| | | | |
|---|---|---|---|
| DE | 3312400 A1 | 9/1984 | |
| EP | 92311093.6 | * 4/1992 | ............ H04Q/3/58 |
| EP | 0 553 553 A3 | 8/1993 | |
| EP | 0 777 354 A2 | 6/1997 | |
| EP | 0 849 713 A1 | 6/1998 | |
| FI | 970629 | 2/1997 | |
| WO | WO 95/01684 | 1/1995 | |
| WO | WO 97/12461 | 4/1997 | |
| WO | WO 97/47111 | 12/1997 | |

OTHER PUBLICATIONS

FI 962352.
PCT International Search Report.

* cited by examiner

Primary Examiner—Thomas R. Peeso
(74) Attorney, Agent, or Firm—Perman & Green, LLP

(57) ABSTRACT

The invention relates to a cellular radio system and a method of ciphering data transmission in a radio system that comprises at least one transceiver communicating with other transceivers on a radio connection including one or more parallel radio bearers or logical channels, ciphering being performed on said bearers or logical channels using selected ciphering method parameters. Ciphering is performed on said bearers using selected ciphering method parameters. To ensure diverse and efficient ciphering, different ciphering method parameters can be used on each parallel radio bearer.

23 Claims, 8 Drawing Sheets

METHOD OF CIPHERING DATA TRANSMISSION, AND CELLULAR RADIO SYSTEM

FIELD OF INVENTION

The invention relates to a method of ciphering data transmission in a radio system that comprises at least one transceiver communicating with other transceivers on a radio connection including one or more parallel radio bearers or logical channels.

BACKGROUND OF INVENTION

Ciphering is today used in many data transmission systems to prevent the data transmitted from falling into the hands of an unauthorized user. The ciphering has grown in significance in the past few years, particularly as wireless telecommunication has become more common.

The ciphering can be performed, for example, by encrypting the information to be transmitted in a transmitter, and by decrypting the information in a receiver. The encryption means that the information to be transmitted, for example a bit stream, is multiplied by a certain number of encryption bit patterns, whereby it is difficult to find out what the original bit stream was if the encryption bit pattern used is unknown.

The prior art teaches many different ciphering methods. Such methods are described, for example, in FI 962 352 and WO 95/01684.

In a digital GSM system, for example, ciphering is performed on the radio path: a ciphered bit stream to be transmitted onto the radio path is formed by XORing data bits with ciphering bits, the ciphering bits being formed by an algorithm known per se (the A5 algorithm), using a cipher key Kc. The A5 algorithm encrypts the information transmitted on the traffic channel and the DCCH control channel.

The cipher key Kc is set when the network has authenticated the terminal but the traffic on the channel has not yet been ciphered. In the GSM system the terminal is identified on the basis of the International Mobile Subscriber Identity IMSI, which is stored in the terminal, or the Temporary Mobile Subscriber Identity TMSI, which is formed on the basis of the subscriber identity. A subscriber identification key Ki is also stored in the terminal. A terminal identification key is also known to the system.

In order that the ciphering would be reliable, information on the cipher key Kc must be kept secret. The cipher key is therefore transmitted from the network to the terminal indirectly. A Random Access Number RAND is formed in the network, and the number is then transmitted to the terminal via the base station system. The cipher key Kc is formed by a known algorithm (the A5 algorithm) from the random access number RAND and the subscriber identification key Ki. The cipher key Kc is computed in the same way both in the terminal and in the network part of the system.

In the beginning, data transmission on a connection between the terminal and the base station is thus not ciphered. The ciphering does not start until the base station system sends the terminal a cipher mode command. When the terminal has received the command, it starts to cipher data to be sent and to decipher received data. Correspondingly, the base station system starts to decipher the received data after sending the cipher mode command and to cipher sent data after reception and successful decoding of the first ciphered message from the terminal. In the GSM system the cipher mode command comprises a command to start ciphering, and information on the algorithm to be used.

The problem in the known methods is that they have been designed for the present systems, wherefore they are inflexible and not suited for the ciphering of data transmission in new systems, where several parallel services for one mobile station are possible. In the GSM, for example, the ciphering of both signalling and an actual traffic channel are interconnected, and the ciphering properties cannot be adjusted separately.

BRIEF DESCRIPTION OF INVENTION

It is an object of the invention to provide a method and a system implementing the method, solving the above problems. This is achieved with a method of ciphering data transmission in a radio system that comprises at least one transceiver communicating with other transceivers on a radio connection including one or more parallel radio bearers, ciphering being performed on said bearers using selected ciphering method parameters. According to the method of invention, on each parallel radio bearer, different ciphering method parameters are used.

The invention also relates to a cellular radio system comprising, in each cell, at least one base station that communicates with terminals located in its coverage area, the system comprising a base station controller that controls the operation of one or more base stations, said base station controller and the base stations controlled by it forming a base station system, and at least some of the terminals in the system being arranged to communicate simultaneously on one or more radio bearers, and said terminals being arranged to use ciphering on the radio bearer. In the system of the invention the base station system and the terminals are arranged to use different ciphering method parameters on each simultaneously used radio bearer.

The preferred embodiments of the invention are claimed in the dependent claims.

Several advantages are achieved with the method and system of the invention. In the solution of the present invention, ciphering and its properties can be flexibly controlled although several parallel bearers are used, either simultaneously (multiplexing into one L1 frame) or on the time division principle. When several data blocks are ciphered in parallel by the XOR method (as in GSM/GPRS), it is important that different data blocks (e.g. data from different bearers) are ciphered using different input parameters for the ciphering algorithm. If this is not done, it is possible for a hacker listening to the transmission and knowing the structure of sent data (e.g. signalling data) to get a XOR from the original data and determine information of the data, even the original data itself, by XORing the data blocks ciphered with the same ciphering parameters. Another advantage of the invention is that the invention can be flexibly applied to radio systems using GSM/GPRS core network. No changes are needed in the GSM A interface, but only in the software of the terminals and the base station system. The present invention enhances user security in new radio systems.

BRIEF DESCRIPTION OF FIGURES

In the following the invention will be described in greater detail by means of preferred embodiments and with reference to the attached drawings, in which.

DETAILED DESCRIPTION OF INVENTION

Figure 1:
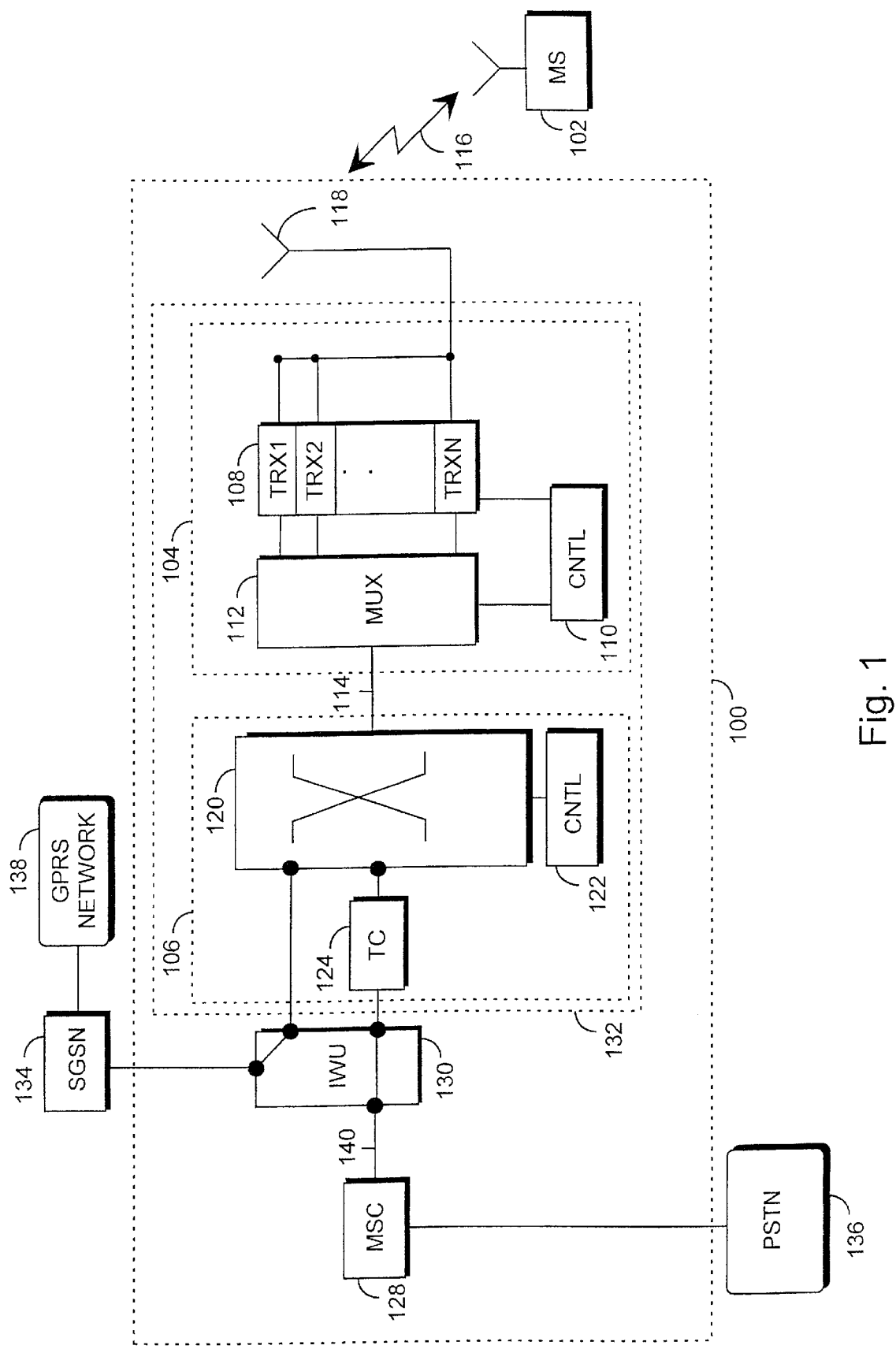
FIG. 1 shows an example of the structure of a cellular radio network according to the invention.

Let us first study the structure of a typical cellular radio network of the invention with reference to FIG. 1. FIG. 1 shows only the blocks that are essential to the invention, but it will be obvious to those skilled in the art that a conventional cellular radio network also comprises other functions and structures which are not described here in greater detail. Some of the examples describe a cellular radio network that uses a TDMA (Time Division Multiple Access) method, but the invention must not be considered to be limited thereto. The invention can also be used in GSM-based cellular radio networks, which are systems that are at least partly based on the GSM specifications. The invention can also be used in the UMTS (Universal Mobile Telephone System) system independently of the radio transmission technology used.

The cellular radio network typically comprises an infrastructure of a fixed network, i.e. a network part 100, and terminals 102, which may be fixed or mounted on a vehicle, or which may be portable terminals. The network part 100 comprises base stations 104. A plural number of base stations 104 is controlled in a centralized manner by a base station controller 106 connected with them. The base station 104 comprises transceivers 108. In a TDMA radio system, for example, one transceiver 108 provides radio capacity for one TDMA frame, which in the GSM system, for example, comprises eight time slots.

The base station 104 comprises a control unit 110, which controls the operation of the transceivers 108 and of a multiplexer 112. The multiplexer 112 is used to combine the traffic and control channels used by the transceivers 108 onto one bearer 114.

The transceivers 108 of the base station 104 are connected to an antenna unit 118, by which a bi-directional radio connection 116 to the terminal 102 is set up. The structure of the frames to be transmitted on the bi-directional radio connection 116 is defined system-specifically, and the connection is called an air interface.

Figure 2:
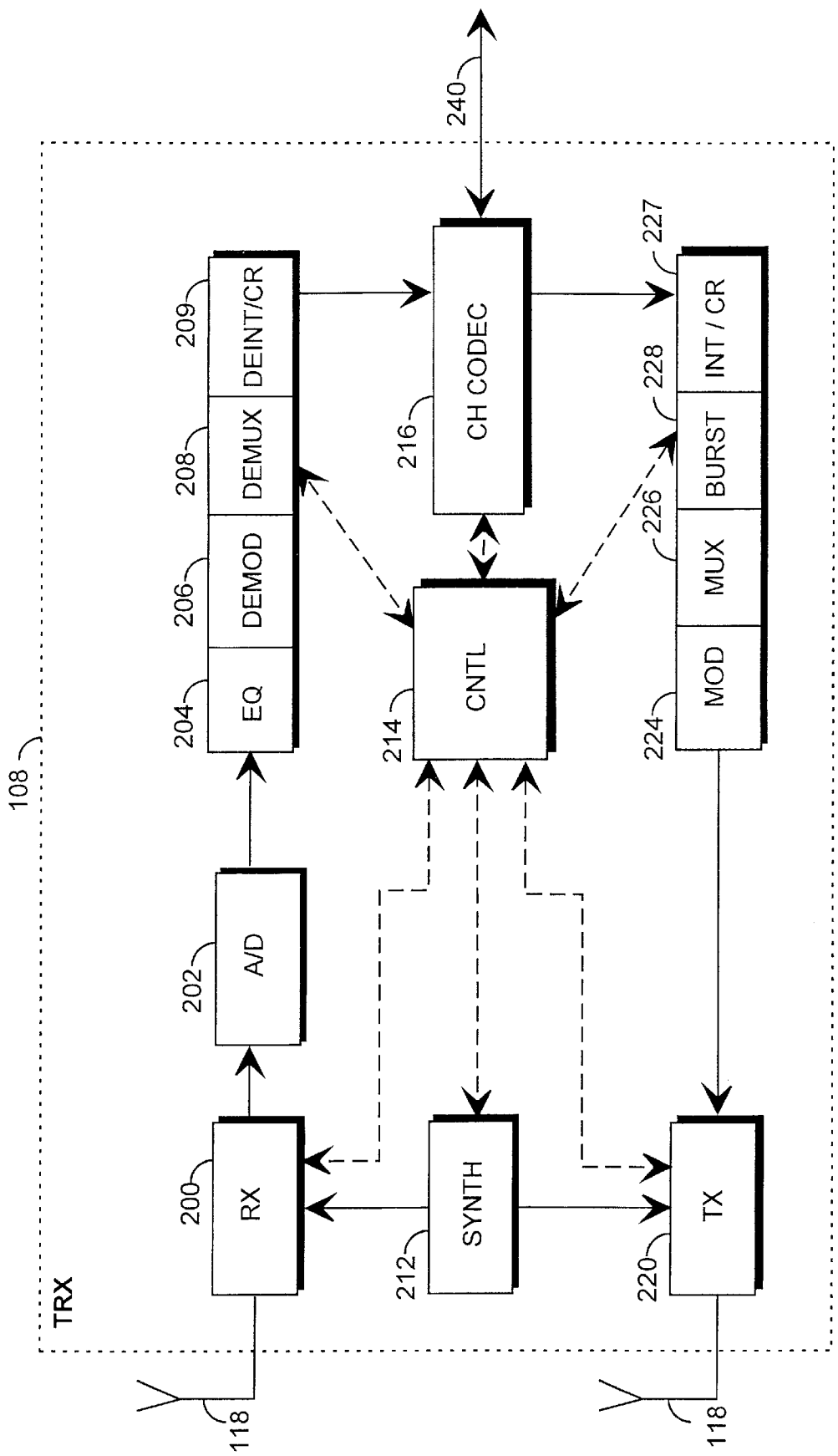
FIG. 2 shows an example of the structure of a transceiver at a base station.

FIG. 2 shows in greater detail an example of the structure of a transceiver 108 at a base station. In the direction of reception, the transceiver comprises a receiver 200, in which a signal received from an antenna unit 118 is converted to an intermediate frequency or directly to a baseband, and the converted signal is then sampled and quantized in an A/D converter 202. From the converter the signal is supplied to an equalizer 204, which compensates interference, for example interference caused by multipath propagation. A demodulator 206 takes a bit stream from the equalized signal, and the steam is then forwarded to a demultiplexer 208. The demultiplexer 208 separates the bit stream from different time slots to specific logical channels. From the demultiplexer the signal is supplied to deinterleaving and to deciphering 209. A channel codec 216 then decodes the bit streams of different logical channels, i.e. decides whether the bit stream consists of signalling information, which is forwarded to a control unit 214, or whether the bit stream consists of speech, which is forwarded 240 to a transcoder 124 of the base station controller 106. The channel codec 216 also performs error correction. The control unit 214 performs internal control functions by controlling different units.

In the direction of transmission, the data coming from the channel codec 216 is subjected to interleaving and ciphering 227. The ciphering can also be located on higher protocol layers (as described in this invention), in which case the block 227 contains only the interleaving function. The signal is then supplied to a burst former 228, which assembles a burst to be transmitted, for example, by adding a training sequence and a tail. A multiplexer 226 allocates a time slot for each burst. A modulator 224 modulates digital signals to a radio-frequency carrier wave. The modulated signal is supplied to a transmitter unit 220, in which the signal is filtered before transmission, i.e. the bandwidth of the signal is restricted to a desired range, and after the filtration the signal is transmitted by an antenna unit 118. In addition, the transmitter 220 controls the output power of the transmission. A synthesizer 212 arranges the necessary frequencies for different units. A clock contained in the synthesizer 212 can be controlled locally or it can be controlled in a centralized manner from some other place, for example from the base station controller 106. The synthesizer produces the necessary frequencies, for example, by a voltage-controlled oscillator.

Let us now study the structure of a base station system and a base station controller with reference to FIG. 1. The base station controller 106 comprises a switching matrix 120 and a control unit 122. The switching matrix 120 is used to switch speech and data and to connect signalling circuits. A Base Station System BSS 132 formed by one or more base stations 104 and the base station controller 106 further comprises a transcoder 124. The transcoder 124 is usually located as close to a mobile services switching centre 128 as possible, since speech can then be transferred in a cellular radio network form between the transcoder 124 and the base station controller 106, and transmission capacity is simultaneously saved. In the UMTS the base station controller 106 can be called a Radio Network Controller RNC and the base station 104 can be called 'NodeB'.

The transcoder 124 converts the different digital encoding methods used between the public switched telephone network and the mobile network so that they are compatible, converting, for example, from the 64 kbit/s form of the fixed network to some other form (e.g. 13 kbit/s) of the cellular radio network, and vice versa. The functions of the control unit 122 are call control, mobility management, collection of statistical information, and signalling.

In the UMTS, an Interworking Unit IWU 130 is used to adapt the base station system 132 to a second-generation GSM mobile services switching centre 128 or to a support node 134 of a second-generation packet network. In FIG. 1, a circuit-switched connection can be established from the terminal 102 to a Public Switched Telephone Network PSTN 136 via the mobile services switching centre 128. In a cellular radio network it is also possible to use a packet-switched connection, such as a General Packet Radio Service GPRS. The connection between the packet network 138 and the IWU 130 is established by a Serving GPRS Support Node SGSN 134. The function of the support node 134 is to transfer packets from the base station system to the packet network 138 and to keep a record of the location of the subscriber terminal 102 in the area of the node.

The interworking unit IWU 130 can be implemented as a physically separate unit, as in FIG. 1, or it can be integrated into the base station controller 106 or the mobile services switching centre 128. As shown in FIG. 1, when packet transmission is used, data is not necessarily transferred between the IWU 130 and the switching matrix 120 through the transcoder 124 when the data transferred is not to be subjected to transcoding.

Figure 3:
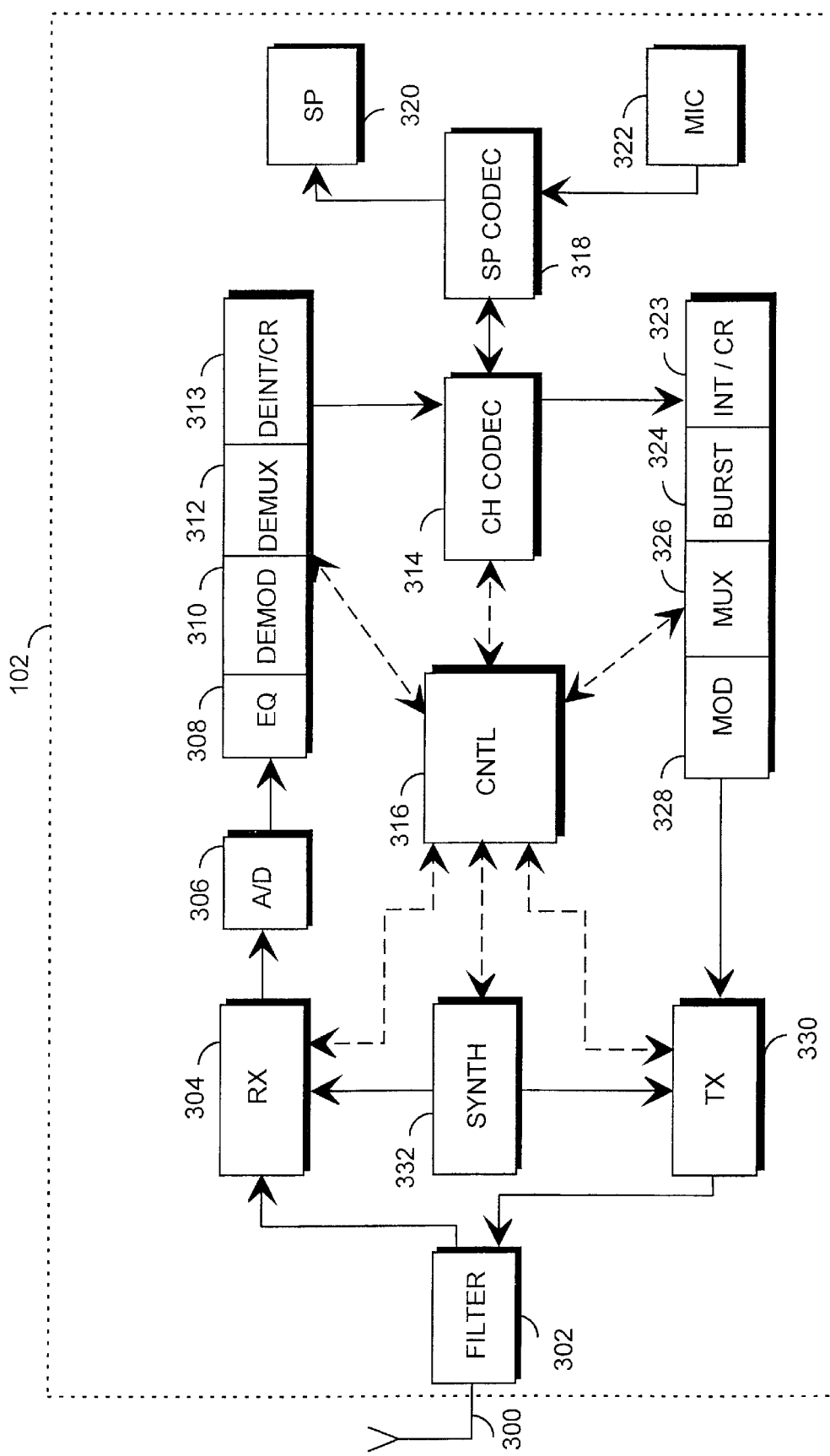
FIG. 3 shows an example of the structure of a subscriber terminal.

Let us now study an example of the structure of the subscriber terminal 102 with reference to FIG. 3. The structure of the terminal is primarily similar to the structure of the transceiver 108 of FIG. 2. In the direction of reception a signal received from an antenna 300 is supplied to a duplex filter 302, which separates the frequencies used in the transmission and in the reception from each other. From the Duplex filter 302 the signal is supplied to radio frequency parts 304, in which the signal is converted to an intermediate frequency or directly to a baseband, and the converted signal is then sampled and quantized in an A/D converter 306. From the converter the signal is supplied to an equalizer 308, which compensates interference, for example interference caused by multipath propagation. A demodulator 310 takes a bit stream from the equalized signal, and the stream is then forwarded to a demultiplexer 312. The demultiplexer 312 separates the bit stream from different time slots to specific logical channels. From the demultiplexer the signal is supplied to deinterleaving and to deciphering 313. The ciphering can also be located on higher protocol layers, in which case the block 313 contains only the interleaving function. A channel codec 314 then decodes the bit streams of different logical channels, i.e. decides whether the bit stream consists of signalling information, which is forwarded to a control unit 316, or whether the bit stream consists of speech, which is forwarded to a speech codes 318, which then decodes the speech. From the speech codec the signal is supplied to a loudspeaker 320. The channel codec 314 also performs error correction. The control unit 316 performs internal control functions by controlling different units. The term "logical channel" used above refers to the TDMA (GSM) system and has a different meaning in the UMTS system.

In the direction of transmission the signal is supplied from a microphone 322 to a speech codec 318, which encodes speech. From the speech codec the signal is supplied to a channel codes 314, in which channel coding is performed. The data obtained from the channel codes 314 is subjected to interleaving and ciphering 319 (in case ciphering is performed on layer 1). The signal is then supplied to a burst former 324, which assembles a burst to be transmitted, for example, by adding a training sequence and a tail to the data obtained from the channel codec 318. A multiplexer 326 allocates a time slot for each burst. A modulator 328 modulates digital signals to a radio-frequency carrier wave. The modulated signal is supplied to a radio-frequency transmitter unit 330, in which the signal is filtered before transmission, i.e. the bandwidth of the signal is restricted to a desired range, and after the filtration the signal is transmitted via the duplex filter 302 by means of the antenna 300. The transmitter 330 also controls the output power of the transmission. A synthesizer 332 arranges the necessary frequencies for different units.

In a mobile system of the invention, for example in the UMTS system, the terminals can communicate with the base station(s) using one or more parallel radio bearers. Let us now study the term 'bearer' in greater detail. The term 'bearer' is a high-level name for transmission of information used in connection with a network service. Depending on the services, information in the UMTS can usually be transmitted using one or more bearers. The services include, for example, speech transmission, data services and video service. A radio bearer, on the other hand, represents that part of the bearer which extends over the air interface. One logical channel normally carries one radio bearer. A logical channel defines the service offered by a MAC layer. A logical channel can be mapped to different types of transport channels depending on the existing service mode (either to a dedicated transport channel DCH or to common transport channels RACH/FACH). The transport channels define the services offered by the physical layer. It is also possible to multiplex several logical channels to one transport channel on the MAC layer. The transport channels are further mapped to physical channels on the physical layer. Several transport channels can be multiplexed to one physical channel by layer 1. It is also possible that after transport-channel-multiplexing the data stream is spliced to several physical channels.

Figure 4:
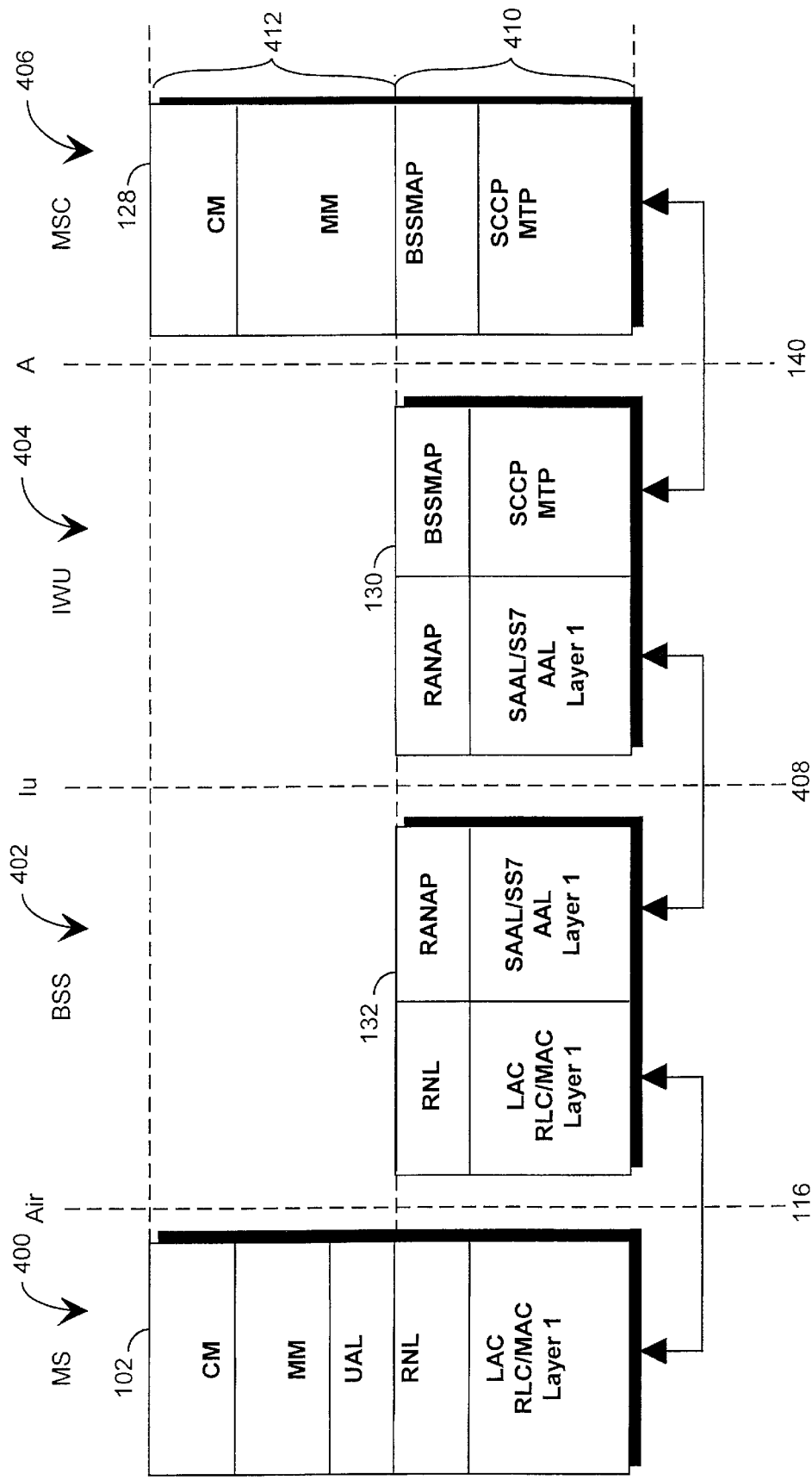
FIG. 4 illustrates the protocol stacks of a cellular radio network.

Since the implementation of the present invention relates to the functions and processing of the protocols used in a cellular radio network , we shall now study an example of how the necessary protocol stacks can be implemented, referring to FIG. 4. In FIG. 4 the protocol stack 400 the furthest away on the left is located in the terminal 102. The next protocol stack 402 is located in the base station system 132. The third protocol stack 404 is located in the IWU 130. The protocol stack 406 the furthest away on the right is located in the mobile services switching centre 128. The air interface 116 implemented on the radio bearer between the subscriber terminal 102 and the base station system can also be called a Um interface. The interface 140 between the base station system 132 and the mobile services switching centre 128 is called an A interface. The interface 408 between the base station system 132 and the IWU is an Iu interface 408.

The protocol stacks are provided in accordance with the OSI model (Open Systems Interconnection) of the ISO (International Standardization Organization). In the OSI model the protocol stacks are divided into layers. There can be seven layers in all. Each unit 102, 132, 130, 128 has a layer which is in logical communication with a layer of another unit. Only the lowest, physical layers communicate with each other directly. The other layers always use the services offered by the next, lower layer. The message must thus physically pass in the vertical direction between the layers, and only in the lowermost layer the message passes horizontally between the layers.

The first and second layers in FIG. 4 are partly combined to level 410. The third layer in FIG. 3 is level 412. The functions of the different layers are divided between different sub-layers. Depending on the unit, the number and names of the sub-layers vary.

The actual bit-level data transmission takes place in the lowermost (first) physical layer, Layer 1. In the physical layer, the mechanical, electrical and functional properties are defined to allow connection to a physical trail. In the air interface 116 the physical layer is implemented using, for example, the TDMA technology in the GSM or the WCDMA technology in the UMTS.

The next (second) layer, i.e. radio link layer, uses the services of the physical layer to effect reliable data transmission, taking care, for example, of transmission error correction by appropriate ARQ mechanisms.

In the air interface 116 the radio link layer is divided into an RLC/MAC sub-layer and an LAC sub-layer. In the RLC/MAC sub-layer (Radio Link Control/Medium Access Control) the function of the RLC part is to segment and assemble the data transmitted. In addition, the RLC part hides any variation in the quality of the radio bearer 116 of the physical layer from the upper layers. The LAC sub-layer (Link Access Control) controls the data flow in the interface between the second and the third layers. The LAC layer transfers the received data flow along the radio bearer 116, using the error detection and correction levels required by the quality level of the service offered. Another possible embodiment is one in which a radio network sub-layer, which will be introduced below, communicates directly with the RLC/MAC sub-layer. In the latter embodiment, the LAC sub-layer may still exist between the mobile station and the core network, being transparent to the radio access network.

The third layer, i.e. network layer, makes the upper layers independent of data transmission and switching techniques by which a connection between the terminals is taken care of. The network layer, for example, establishes, maintains and releases a connection. In the GSM the network layer is also called a signalling layer. It has two main functions: it routes messages, and allows several simultaneous connections between two entities.

Let us first study the network layer of the GSM. In a common GSM system the network layer comprises a connection management sub-layer CM, a Mobility Management sub-layer MM, and a Radio Resource Management sub-layer.

The radio resource management sub-layer is dependent on the radio technology used in the GSM and it manages the frequency spectrum and the reactions of the system to any changes in the radio conditions. In addition, it maintains a high-quality channel, for example by taking care of channel selection, channel release, any frequency hopping sequences, power control, time tuning, reception of measurement reports from the subscriber terminal, adjustment of a timing advance, cipher mode settings, and handover between cells. Messages are transferred in the sub-layer between the subscriber terminal 102 and the base station controller 106. In the downlink direction some of the radio resource management messages can be transferred from the base station to the subscriber terminal 102.

The mobility management sub-layer MM takes care of any such consequences resulting from the mobility of the terminal user that are not directly associated with the operation of the radio resource management sub-layer. In a fixed network, the sub-layer would check the user's authorization and control the logging-in to the network. In a cellular radio network the sub-layer thus supports the user mobility, registration, and the management of data resulting from the mobility. In addition, the sub-layer checks the identity of the subscriber terminal and the identities of the services the terminal is authorized to use. In this sub-layer messages are transferred between the subscriber terminal 102 and the mobile services switching centre 128.

The connection management sub-layer CM manages all functions relating to the management of a circuit-switched call. The functions are taken care of by a call management entity; the other services, such as an SMS (Short Message Service), have their own entities. The connection management sub-layer does not detect user mobility. In the GSM the functions of the connection management sub-layer are thus almost directly derived from the ISDN (Integrated Services Digital Network) of the fixed network. The call management entity establishes, maintains and releases calls. It has different procedures for calls initiated by the subscriber terminal 102 and for those terminated therein. The messages are also transferred in this sub-layer between the subscriber terminal 102 and mobile services switching centre 128.

FIG. 4 illustrates a protocol stack of the UMTS system. In a normal physical layer in the GSM, TDMA technology is used. In the UMTS it is replaced with wideband CDMA technology (Code Division Multiple Access) or a combination of the wideband CDMA and TDMA technologies. The above GSM radio resource management sub-layer can then not be re-used in the UMTS; instead, it is replaced with a Radio Network sub-layer RNL providing the same services upward. The radio network sub-layer can be divided into RBC (Radio Bearer Control) and RRC (Radio Resource Control) sub-layers, but it can also be maintained undivided. If maintained undivided, it can be called the RRC sub-layer. If divided into sub-layers, the RRC sub-layer, for example, takes care of cell information broadcast, paging, processing of the measuring results of the subscriber terminal 102, and handover. The RBC sub-layer, on the other hand, takes care of establishing a logical connection, thereby defining, for example, the bit rate and other physical layer parameters needed for the radio bearer, the bit error ratio, and whether a packet-switched or a circuit-switched type of physical resource reservation is concerned.

For dual-mode terminals (UMTS+GSM) an UAL sub-layer (UMTS Adaptation Layer) is needed between the mobility management and radio network sub-layers in the subscriber terminal 102. In the UAL sub-layer the primitives of the higher, mobility management sub-layer are converted into the primitives of the lower, radio network sub-layer. The UAL layer allows adaptation of several $2^{nd}$ generation mobility management sub-layers (e.g. GPRS and GSM mobility management sub-layers) to a single radio network sub-layer.

The only sub-layer of the network layer processed in the base station system 132 is the radio network sub-layer; the messages of the connection management and the mobility management sub-layers are processed transparently, e.g. they can be carried as payload in RRC messages. A RANAP sub-layer (Radio Access Network Application Part) provides procedures for negotiation and management of both circuit-switched and packet-switched connections. It corresponds to a BSSAP (Base Station System Application Part) of the GSM, which consists of a BSSMAP (Base Station System Management Part) and a DTAP (Direct Transfer Application Part).

The lower layers of the Iu interface 408 can be implemented, for example, using the ATM protocols (Asynchronous Transfer Mode) SAAL/SS7 (Signalling ATM Adaptation Layer/Signalling System Number 7) and AAL (ATM Adaptation Layer).

The IWU 130 has the corresponding RANAP, SAAL/SS7 and AAL sub-layers and the physical layer as the base station system 132. The lower layers between the IWU and the BSS can also be implemented with other protocols.

In addition, the IWU 130 and the mobile services switching centre 128 comprise a BSSMAP layer, which is used to transfer information on a specified subscriber terminal 102 and control information on the base station system 132 between the IWU 130 and the mobile services switching centre 128.

In the A interface the first and the second layers can be implemented using MTP and SCCP sub-layers (Message Transfer Part; Signalling Connection Control Part). Their structure is simpler than in the air interface 116, since for example no mobility management is needed.

The invention can thus be applied to a radio system whose terminals can communicate with other transceivers using one or more parallel radio bearers. Typically, when a call is established between a terminal and a network, a physical channel is first established for a Signalling Radio Bearer SRB between the terminal and the base station subsystem, and once this channel has been established, the actual traffic bearer(s) can be established. The SRB can also be called a signalling link.

Figure 5:
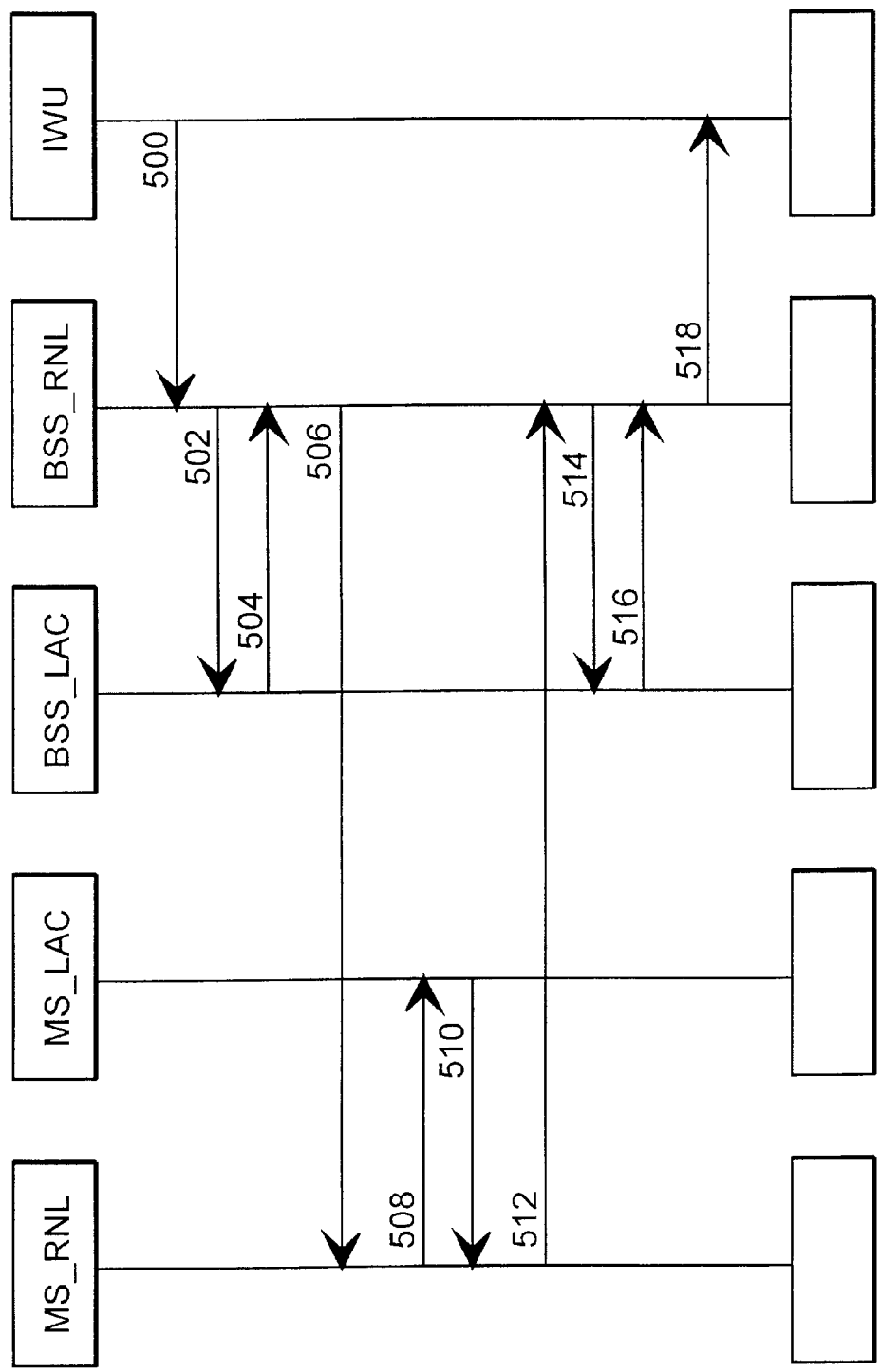
FIG. 5 shows an example of a message sequence scheme describing the cipher mode setting according to the invention.

Let us now study an example for a cipher mode setting procedure on a signalling radio bearer by means of a message sequence scheme shown in FIG. 5. The figure shows a radio network layer (RNL) and a logical link access control layer (LAC) of the terminal, the corresponding layers of the base station system, and the interworking unit IWU. It is to be understood, however, that FIG. 5 illustrates only an example of possible signalling. In the solution of the invention the decisions associated with ciphering can also be made in other protocol layers than those described in connection with FIG. 5.

The setting procedure is carried out after the signalling radio bearer SRB has been set up and the authentication of the user with the core network has been performed.

In step 500 the BSS-RNL receives a cipher key Kc from a message (CIPHER_MODE_COMMAND) sent by the IWU or by the CN node. The message comprises a cipher key and information on the ciphering algorithms allowed. The BSS can store the allowed ciphering algorithms for this mobile station for future use. The BSS also decides what algorithm or algorithms are used for the signalling radio bearer. The decision is made on the basis of the properties of the terminal. The properties are described, for example, by so-called classmark data in the GSM. In the UMTS this data may be called "user equipment capabilities". The data describes the technical properties of the terminal, such as the transmission power and ciphering capacity of the terminal, and the frequencies supported by the terminal. The terminal sends its classmark data to the network at the beginning of each new connection.

In this particular figure, it is assumed, by way of an example, that the ciphering of the traffic channel is performed in the LAC layer. It is not essential to the invention, however, on which protocol level the ciphering is performed. (The used protocol layer affects mainly the frame number that can be used as an input parameter to the ciphering algorithm, see FIG. 8.) When the BSS-RNL has made a decision on the ciphering parameters to be used, it sends the BSS-LAC layer a request in step 502 to the effect that deciphering of the information received should be started. The message comprises information on the key Kc to be used and on the algorithm to be used in the uplink direction.

In step 504 the BSS-RNL receives an acknowledgement from the BSS-LAC layer.

In step 506 the BSS-RNL sends a ciphering mode message (CIPHERING_MODE_COMMAND) to the RNL layer of the terminal. The message is transmitted in unencrypted form. In the solution of the invention, the algorithms used in the different directions of transmission are contained in the parameters of the message. If the same algorithm is used in both directions of transmission, the message comprises only one algorithm.

In step 508 the MS-RNL, after receiving the ciphering mode command, requests that the MS-LAC layer should start to cipher the signal transmitted and to decipher the signal received using the desired algorithms.

In step 510 the MS-LAC sends an acknowledgement to the MS-RNL layer.

In step 512 the MS-RNL sends an acknowledgement of the ciphering mode command (CIPHERING_MODE_COMPLETE) to the BSS-RNL. The message is transmitted in encrypted form.

In step 514 the BSS-RNL requests the BSS-LAC layer to start ciphering in the downlink direction. The message or primitive comprises information on the algorithm to be used, if it is different from the algorithm used on the uplink.

In step 516 the BSS-LAC sends an acknowledgement to the BSS-RNL.

In step 518 the BSS-RNL sends the network a notification indicating that ciphering has been started.

On account of the above method neither the terminal nor the base station will send an encoded signal before the receiving party is capable of decoding.

The procedure described in FIG. 5 can also be used during the connection to change cipher mode parameters of one or more radio bearers.

The system of the invention also makes it possible to change the ciphering parameters as the traffic bearers are being set up or reconfigured. The ciphering parameters, such as the ciphering key Kc or the ciphering algorithm, can be different on different radio bearers, e.g. on a traffic bearer and on the signalling radio bearer or between two traffic bearers.

Figure 6:
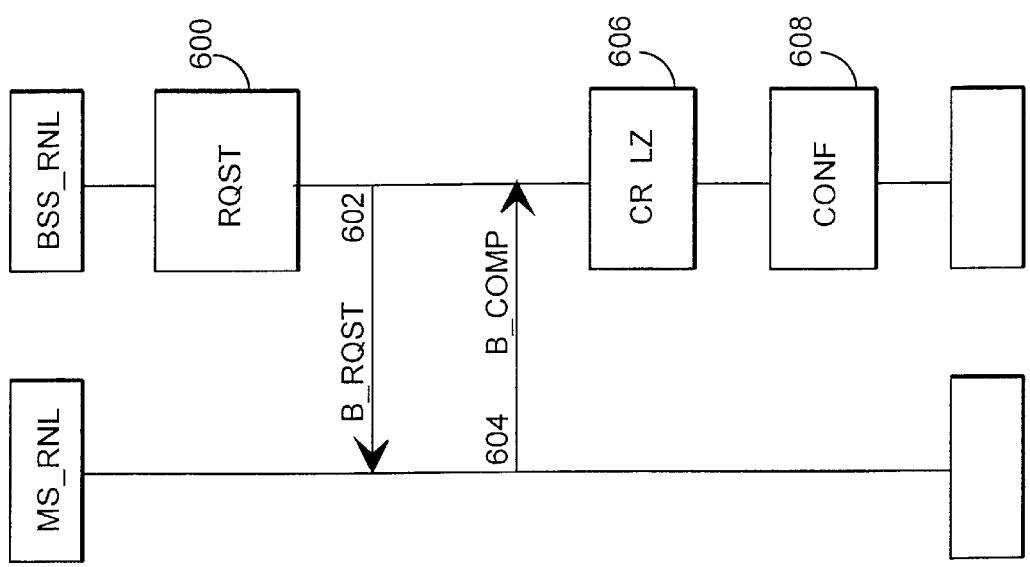
FIG. 6 shows another example of a message sequence scheme describing the cipher mode setting according to the invention.

Let us now study an example of a cipher mode setting procedure on an actual traffic bearer by means of a message sequence scheme shown in FIG. 6. The figure shows a radio network layer (RNL) of the terminal and a radio network layer of the base station system. It is to be understood that FIG. 6, like FIG. 5, only illustrates one example of possible signalling. FIG. 6 does not illustrate all the details of communication, i.e. how the messages travel in the lower bearer layers and the physical layers. The communication is described as so-called peer-to-peer communication, i.e. communication between corresponding layers.

The cipher mode setting procedure on an actual traffic bearer is performed in connection with setting up the radio bearer. The network makes a decision on the ciphering parameters of the connection. In step 600 a new traffic bearer is requested from the network.

In step 602 the BSS-RNL sends a bearer message to the MS-RNL layer. The message comprises a Bearer Identifier BID and a Quality of Service of the bearer concerned BEARER QOS. The message further comprises a ciphering algorithm for both directions of transmission as parameters. It is thus possible to define by a single message that a different algorithm is used in different directions of transmission. If the same algorithm is used in both directions of transmission, then the message comprises only one algorithm. The message further comprises a notification (CIPHERKEYCHANGE, ITERATIONCOUNT) indicating whether the cipher key used on the signalling radio bearer SRB has to be changed. If the cipher key is changed, the preferred way of computing the key is, for example, to use the same algorithm as when the original key Kc was computed, and to use the original random access number RAND and the previous cipher key Ki as the parameters of the algorithm. An algorithm can often be iterated several times in succession, and the number of iterations is determined by the parameter ITERATIONCOUNT.

In step 604 the MS-RNL sends an acknowledgement to the BSS-RNL layer. In step 606 the entities of the second layer (Layer 2) are provided for a new radio bearer, and in step 608 a confirmation of the new bearer is sent to the network. Since the second layer is not provided for the new bearer until the parameters of the connection have been decided on (by means of messages 602 and 604), the cipher mode setting does not require separate signalling.

The system according to the invention also allows a change in the ciphering method parameters used on the radio bearer during the connection.

Figure 7:
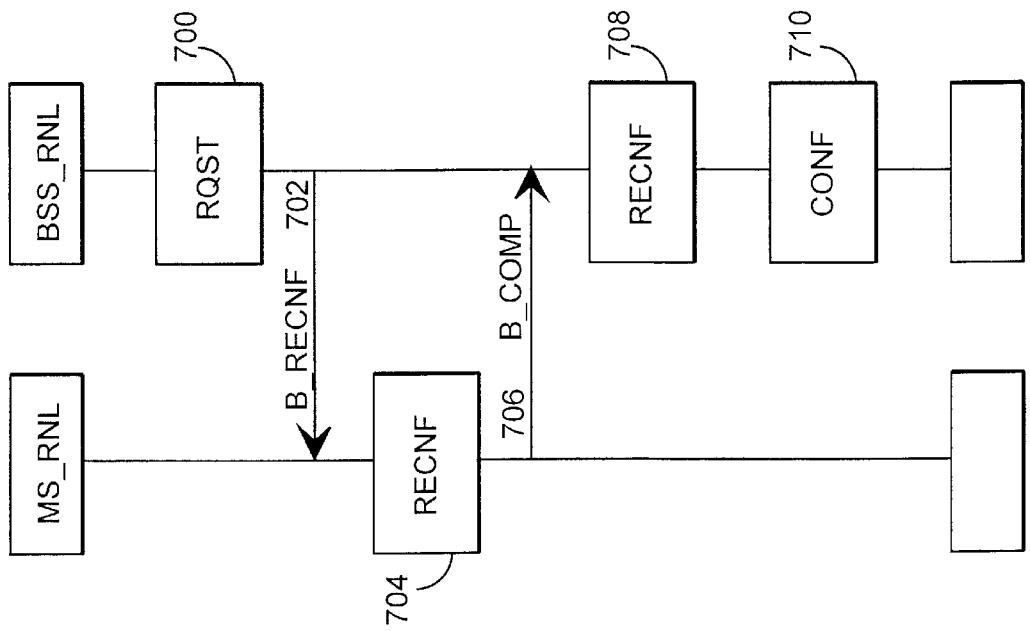
FIG. 7 shows a third example of a message sequence scheme describing the cipher mode setting according to the invention.

Let us now study an example of a cipher mode setting procedure on an actual traffic bearer by means of a message sequence scheme shown in FIG. 7. The figure shows a radio network layer (RNL) of the terminal and a radio network layer of the base station system. It is to be understood that FIG. 7, like FIG. 6, only illustrates one example of possible signalling. Further, FIG. 7 does not show all the details of communication, i.e. how the messages travel in the lower bearer layers and the physical layers.

In step 700 the network sends the BSS-RNL layer a bearer reconfiguration request.

In step 702 the BSS-RNL sends the bearer reconfiguration request B_RECNF to the corresponding layer MS-RNL located in the subscriber terminal. The reconfiguration request B_RECNF comprises one or more bearer identifiers BID and corresponding qualities of service BEARER QOS for the RNL layer of the terminal. The message further comprises a ciphering algorithm for both directions of transmission as parameters. It is thus possible to define by a single message that different algorithms are used in different directions of transmission. If the same algorithm is used in both directions of transmission, the message comprises only one algorithm. Another parameter of the message is an indication (CIPHERKEYCHANGE, ITERATIONCOUNT) whether the cipher key has to be changed. The change of the cipher key can preferably be carried out in the way described in connection with FIG. 6.

In step 704 the radio network sub-layer MS-RNL of the subscriber terminal triggers reconfiguration. After successful reconfiguration, the subscriber terminal sends an acknowledgement B_COMP comprising a single parameter: the bearer identity BID. If the cipher change relates to the bearer used to transfer the messages B_RECNF and B_COMP, then the message B_COMP will be transmitted using the new ciphering.

In step 708 the BSS-RNL performs reconfiguration, and in step 710 it sends a confirmation of the configuration to the network.

The reconfiguration according to FIG. 7 can be performed both on signalling radio bearers and on traffic bearers.

Figure 8:
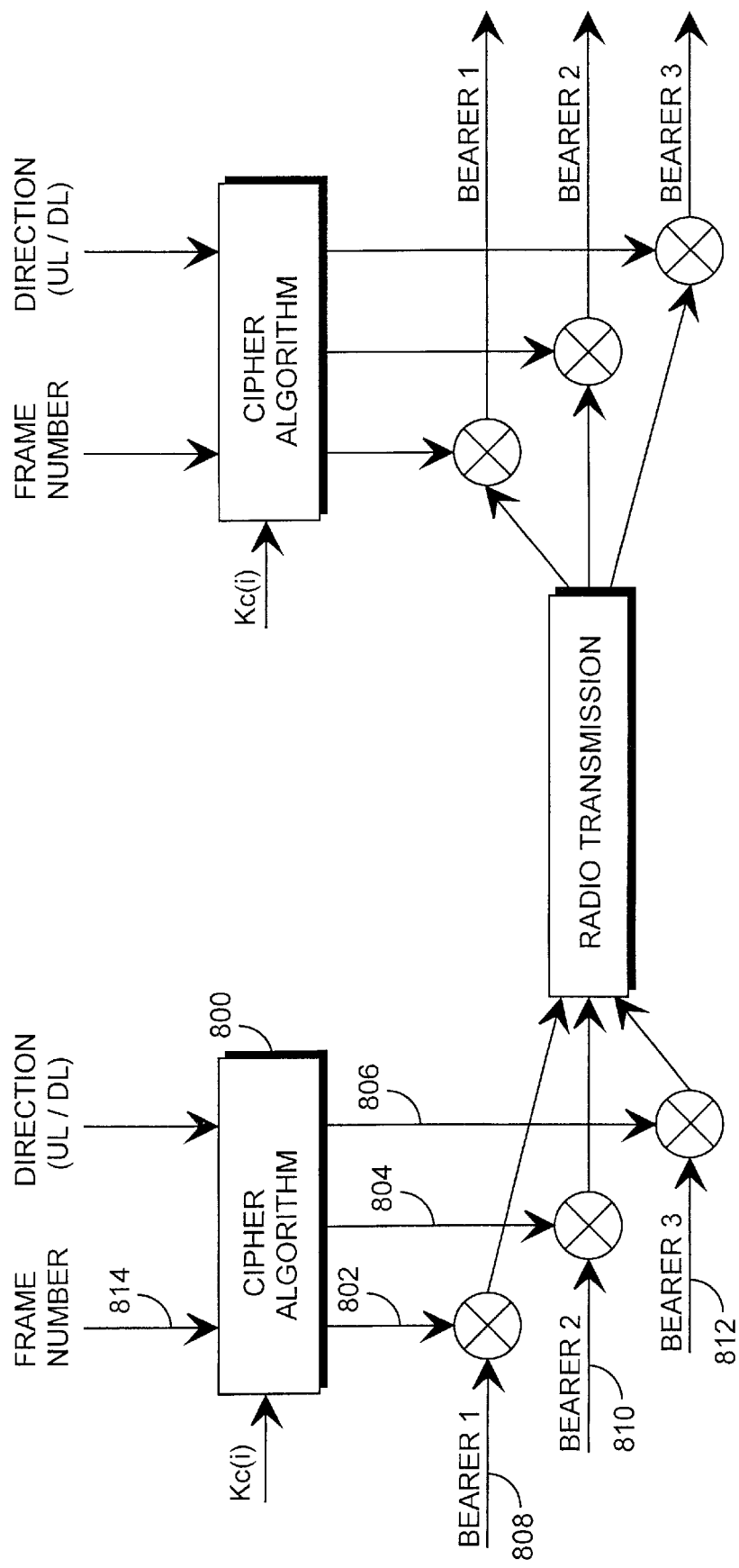
FIG. 8 shows a block diagram of a ciphering environment according to the invention.

FIG. 8 describes a block diagram defining the basic ciphering environment defined in the present invention. In contrast to existing systems (GSM-GPRS) for each parallel radio bearer, a bearer specific Kc(i) is used and thus the ciphering mask (the bit string) produced by the algorithm is bearer-specific. The procedure is performed in a calculation unit 800 separately for each bearer. Ciphering masks 802–806 from the calculation unit 800 are XORed with data blocks 808–812 from the bearers to obtain the ciphered data. The Frame Number used as an input parameter of the calculation unit depends on the protocol layer where the ciphering function is implemented. If it is implemented on the LLC layer (like in GPRS), a LLC frame number must be used and some mechanisms to convey the used frame number to the receiving entity have to be defined. If the ciphering function is located in the MAC layer or layer 1, a frame number at least partly consisting of the physical frame number (used for transmitting the data block on layer 1) can be used.

The ciphered data is transmitted on the radio path and deciphering is performed in the receiver.

Figure 9:
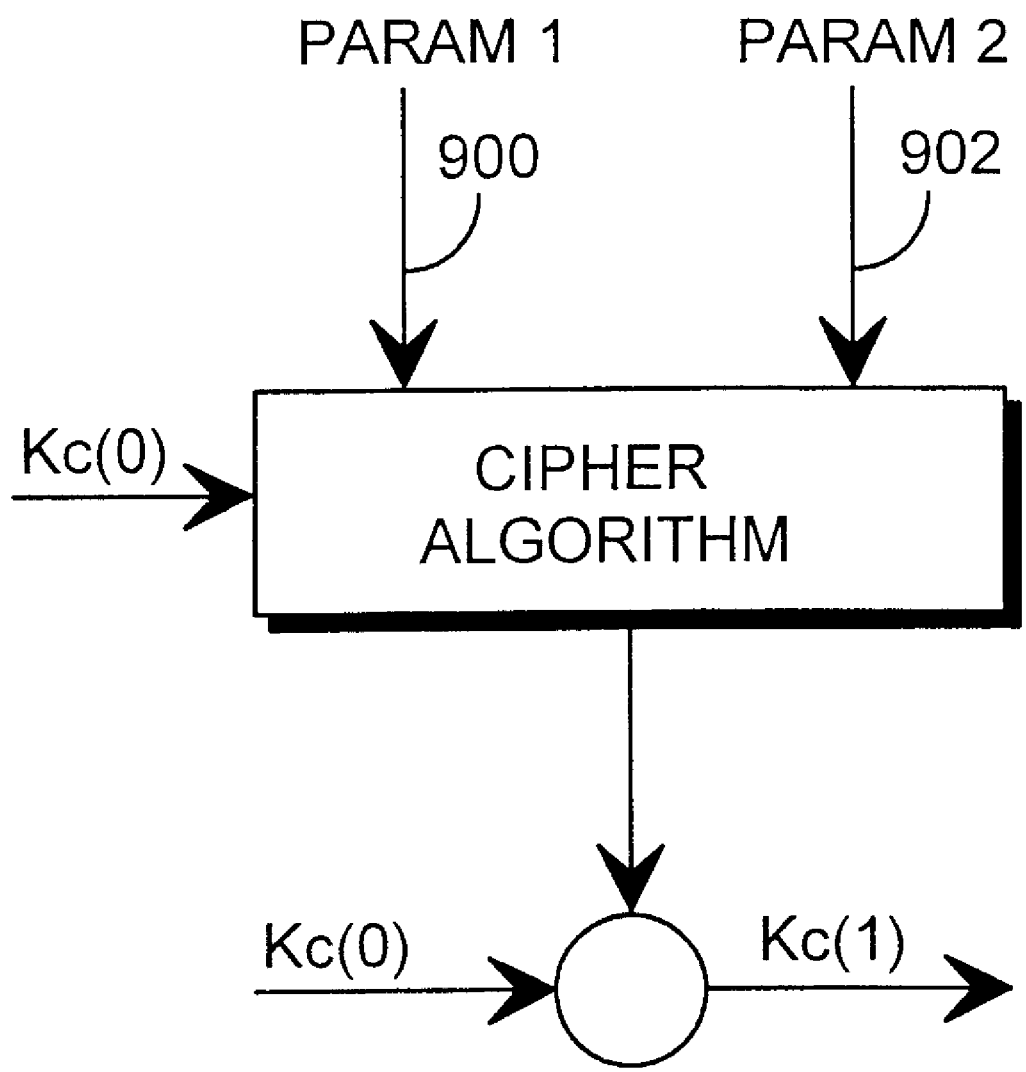
FIG. 9 shows an example of calculation of bearer-specific ciphering keys (Kc(i)).

FIG. 9 shows an example of how the bearer-specific ciphering key Kc(i) is calculated using the ciphering algorithm and Kc of the signalling radio bearer (in the example, bearer 0) as a starting point. The Kc and algorithm used here could also be those of some other bearer than the signalling bearer. Other required input parameters 900, 902 for the ciphering algorithm can be calculated according to predefined rules, or they can be included in the signalling messages sent from the BSS to the terminal every time a new Kc(i) needs to be calculated (parameters for the bearer setup or reconfiguration or ciphering mode command messages).

In the GSM the network can request user authentication at any time during the existence of a radio bearer. The ciphering parameters can here be changed. This kind of option is also probable in future mobile systems, such as the UMTS system. In the system of the invention, the terminal can have several parallel radio bearers, and on each radio bearer, different ciphering parameters may be used. Since the actual ciphering it preferably performed on a connection between the terminal and the base station system, the BSS-RNL layer can decide how the authentication requested by the network and the cipher mode setting are carried out. The alternatives include:

the new RAND number is stored for future use, but the cipher mode setting is ignored, the cipher key is changed on the signalling radio bearer, the cipher key is changed on all active bearers.

In the solution of the invention the base station controller may have information on the cipher keys used. This must be taken into account as the terminal performs handover, switching to a base station that is controlled by a different base station controller than the old base station. The information needed is transferred in the invention from the old base station controller to the new base station controller in connection with the handover.

The solution of the invention is implemented in the radio system preferably by software, whereby the invention requires certain functions in the protocol processing software located in the control unit 122 of the base station controller 106, and in the protocol processing software located in the processor 316 of the transceiver of the subscriber terminal 102. Part of the solution can be implemented in part with hardware (for example using ASIC, discrete components or by DSP) to meet the time requirements, if data from several parallel bearers needs to be ciphered simultaneously so that they can be multiplexed into one radio frame. This mainly concerns the ciphering unit presented in FIG. 9.

Although the invention is described above with reference to the example illustrated in the attached drawings, it is to be understood that the invention is not limited thereto but can be varied in many ways within the scope of the inventive idea disclosed in the attached claims.

We claim:

1. A method of ciphering data transmission in a radio system that comprises at least one transceiver communicating with other transceivers on a radio connection including one or more parallel radio bearers, the method comprising ciphering on said bearers using selected ciphering method parameters, and on each parallel radio bearer, different ciphering method parameters are used.

2. A method as claimed in claim 1, wherein the radio system is a cellular radio system comprising base stations and base station controllers, each base station controlling radio transmission and reception in one or more cells, each cell identified by a cell identity broadcasting on one physical channel, and each base station controller controlling the use and the integrity of the radio resources in cells, at least one cell communicating with terminals located in its coverage area, said base station controller and the base stations controlled by it forming a base station subsystem, and the terminals communicating with at least one cell using one or more radio bearers.

3. A method as claimed in claim 2, wherein at least one radio bearer is bi-directional, and that different ciphering method parameters are used in different directions of transmission.

4. A method as claimed in claim 2, wherein at least one radio bearer is bi-directional, and similar ciphering method parameters are used in both directions of transmission.

5. A method as claimed in claim 2, wherein the ciphering method parameters used on a radio bearer are changed during the connection.

6. A method as claimed in claim 1 wherein the ciphering method used is defined by at least a cipher key, a ciphering algorithm.

7. A method as claimed in claim 6, wherein the ciphering method used is further defined by a number of iterations of the algorithm.

8. A method as claimed in claim 1, wherein, when a connection between the terminal and the base station is being established, a connection is first established for a signalling link, after which a connection is established for an actual traffic bearer or bearers, and the ciphering method parameters used are changed when the traffic bearer or bearers are being set up.

9. A method as claimed in claim 8, wherein the base station system sends the terminal a traffic bearer setup message that comprises information on the ciphering method parameters used on the traffic bearer.

10. A method as claimed in claim 4, wherein the base station system sends the terminal a radio bearer reconfiguration message that comprises information on the ciphering method parameters used on the radio bearers.

11. A method as claimed in claim 4, wherein the base station system sends the terminal a ciphering mode command message that comprises information on the ciphering method parameters used on the radio bearers.

12. A method as claimed in claim 9, wherein the traffic bearer setup message comprises at least one of the following:
   a radio bearer identifier
   information on the change of the cipher key;
   one or more ciphering algorithms;
   a number of iterations of the ciphering algorithm.

13. A method as claimed in claim 11, wherein the radio bearer reconfiguration message comprises at least one of the following:
   a radio bearer identifier;
   information on the change of the cipher key;
   a number of iterations of the ciphering algorithm.

14. A method as claimed in claim 11, wherein the ciphering mode command message comprises at least one of the following:
   a radio bearer identifier;
   information on the change of the cipher key.

15. A method as claimed in claim 12, wherein the information on the change of the cipher key defines parameters and rules for calculating a bearer specific Kc(i).

16. A method as claimed in claim 12, wherein the rules for calculating a bearer specific Kc(i) are predefined.

17. A method as claimed in claim 12, wherein the rules for calculating a bearer-specific Kc(i) use the ciphering algorithm and Kc already in use for the signalling bearer or some of the traffic bearers.

18. A cellular radio system comprising, in each cell, at least one base station that communicates with terminals located in its coverage area, the system comprising a base station controller that controls the operation of one or more base stations, said base station controller and the base stations controlled by it forming a base station system, and at least some of the terminals in the system being arranged to communicate simultaneously on one or more radio bearers, and said terminals being arranged to use ciphering on the radio bearer, and the base station system and the terminals are arranged to use different ciphering method parameters on each simultaneously used radio bearer.

19. A cellular radio system as claimed in claim 18, wherein the base station system and the terminals are arranged to have a bi-directional data transmission connection and to use different ciphering method parameters in different directions of transmission.

20. A cellular radio system as claimed in claim 18, wherein, when a call is being established, the terminal and the base station system are arranged to first establish a connection for a signalling radio bearer, and when this connection has been established, for an actual traffic bearer, and that the terminal and the base station system are arranged to change the ciphering method parameters as the traffic bearer connection is being established, so that the base station system sends the terminal a traffic bearer request (BRQST) comprising information on the ciphering method parameters used on the traffic bearer connection.

21. A cellular radio system as claimed in claim 18, wherein the terminal and the base station system are arranged to change the ciphering method parameters used on the radio bearer during the connection such that the base station system sends the terminal a radio bearer reconfiguration message, which comprises information on the ciphering method parameters used on the radio bearer connection.

22. A method of ciphering data transmission in a radio system that comprises at least one transceiver communicating with other transceivers on a radio connection including one or more parallel radio bearers, the method comprising: transmitting a plurality of signals via a plurality of parallel radio bearers from said one transceiver, selecting different ciphering parameters for respective ones of said bearers, and ciphering the signals on respective ones of said bearers using respective ones of said different ciphering parameters.

23. A cellular radio system comprising, in each cell, at least one base station that communicates with terminals located in its coverage area, the system comprising a base station controller that controls the operation of one or more base stations, said base station controller and the base stations controlled by it forming a base station system, and at least some of the terminals in the system being arranged to communicate simultaneously on one or more radio bearers, and wherein said system operates with a plurality of different ciphering parameters, and each of an individual one of said terminals and said base station system enciphers signals to be communicated via a plurality of said radio bearers, ciphering of signals being accomplished by use of different ones of said plurality of ciphering parameters on signals communicated by respective ones of said radio bearers.

* * * * *